US010186005B2

(12) United States Patent
Hirakawa et al.

(10) Patent No.: US 10,186,005 B2
(45) Date of Patent: Jan. 22, 2019

(54) FACILITY UTILIZATION MEASUREMENT APPARATUS, FACILITY UTILIZATION MEASUREMENT SYSTEM, AND FACILITY UTILIZATION MEASUREMENT METHOD

(71) Applicant: PANASONIC INTELLECTUAL PROPERTY MANAGEMENT CO., LTD., Osaka (JP)

(72) Inventors: Kunio Hirakawa, Kanagawa (JP); Yuichi Nakahata, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 347 days.

(21) Appl. No.: 14/798,688

(22) Filed: Jul. 14, 2015

(65) Prior Publication Data
US 2016/0019664 A1    Jan. 21, 2016

(30) Foreign Application Priority Data
Jul. 16, 2014    (JP) .................................. 2014-145989

(51) Int. Cl.
G06Q 50/12    (2012.01)
G06Q 30/06    (2012.01)
(Continued)

(52) U.S. Cl.
CPC .......... *G06Q 50/12* (2013.01); *G06Q 10/063* (2013.01); *G06Q 30/06* (2013.01)

(58) Field of Classification Search
USPC .......................................................... 705/15
See application file for complete search history.

(56) References Cited

U.S. PATENT DOCUMENTS

2009/0134968 A1* 5/2009 Girgensohn ..... G08B 13/19613
340/3.1
2010/0013931 A1* 1/2010 Golan ................ G06K 9/00771
348/150
(Continued)

FOREIGN PATENT DOCUMENTS

JP    2003-256843    9/2003

OTHER PUBLICATIONS

U.S. Appl. No. 14/813,494 to Yuichi Matsumoto et al., which was filed on Jul. 30, 2015.
(Continued)

*Primary Examiner* — Garcia Ade
(74) *Attorney, Agent, or Firm* — Greenblum & Bernstein, P.L.C.

(57) ABSTRACT

According to an embodiment of the present invention, there is provided a facility utilization measurement apparatus. The facility utilization measurement apparatus sets a plurality of determination areas for determining whether a user stays, on an image which is obtained by capturing the inside of the facility. The facility utilization measurement apparatus generates stay information regarding whether the user stays for each determination area based on a change status of the image in the determination area. The facility utilization measurement apparatus generates use information regarding utilization for each determination area based on the stay information, generates display information for displaying the use information, and outputs the generated display information.

8 Claims, 14 Drawing Sheets

(51) Int. Cl.
*G06Q 10/06* (2012.01)
*G05B 23/02* (2006.01)

(56) References Cited

U.S. PATENT DOCUMENTS

| | | |
|---|---|---|
| 2013/0182114 A1* | 7/2013 | Zhang .................... H04N 7/18 |
| | | 348/150 |
| 2013/0197890 A1* | 8/2013 | Ide ...................... G01C 21/3484 |
| | | 703/6 |
| 2014/0222501 A1 | 8/2014 | Hirakawa et al. |
| 2015/0095107 A1 | 4/2015 | Matsumoto et al. |
| 2015/0120237 A1 | 4/2015 | Gouda et al. |
| 2015/0199698 A1 | 7/2015 | Yoshitake et al. |
| 2015/0220935 A1 | 8/2015 | Iwai |

OTHER PUBLICATIONS

U.S. Appl. No. 14/668,047 to Yuichi Matsumoto et al., which was filed on Mar. 25, 2015.

\* cited by examiner

FIG. 6

▓ FRAME (POINT OF TIME) WHICH IS DETERMINED TO STAY (BE SEATED)

| FrameNo | 50 | 100 | 150 | 200 | 250 | 300 | 350 | 400 | 450 | 500 | 550 | 600 | 650 |
|---|---|---|---|---|---|---|---|---|---|---|---|---|---|
| SEAT 1 | 0.29 | 0.31 | 0.24 | 41.2 | 51.5 | 4.79 | 2.89 | 18.8 | 42.7 | 42.8 | 17.5 | 13.8 | 6.7 |
| SEAT 2 | 0.05 | 0.16 | 0.05 | 0.43 | 35.6 | 15.1 | 6.02 | 11.1 | 28.3 | 19.8 | 12.3 | 28.7 | 28 |
| SEAT 3 | 0.11 | 0.16 | 0.05 | 0.45 | 35.8 | 38.9 | 7.72 | 3.39 | 37.1 | 24.1 | 21.2 | 31 | 2 |
| SEAT 4 | 0.02 | 0.02 | 0.05 | 0.11 | 0.21 | 34.4 | 18.7 | 10 | 25.7 | 11.8 | 10.6 | 13.6 | 7.2 |
| SEAT 5 | 0.2 | 0.2 | 0.15 | 0.3 | 0.2 | 50.8 | 37.4 | 22 | 39.9 | 52.6 | 32.3 | 50 | 47.4 |
| SEAT 6 | 0 | 0.04 | 0.04 | 0.08 | 0.16 | 69.4 | 19.5 | 29.5 | 41.8 | 55.9 | 49.7 | 31 | 11 |
| SEAT 7 | 0.07 | 0.02 | 0.09 | 0.05 | 0 | 55.4 | 40.1 | 8.25 | 14.1 | 20.9 | 12.7 | 10.9 | 1.5 |
| SEAT 8 | 0.07 | 0 | 0.07 | 0.07 | 0.02 | 0.36 | 60 | 24.2 | 10.3 | 19.6 | 14.6 | 19.8 | 5.0 |
| SEAT 9 | 0.02 | 0.02 | 0 | 0.05 | 0.05 | 0.49 | 49.8 | 14.2 | 24.1 | 16.9 | 29.3 | 19.6 | 12 |
| SEAT 10 | 0.07 | 0.1 | 0 | 0.07 | 0.07 | 0.17 | 70.6 | 22.9 | 39.1 | 28.5 | 4.14 | 6 | 28.1 |
| SEAT 11 | 0.32 | 0.11 | 0.23 | 0.2 | 0.29 | 0.32 | 42.1 | 11.8 | 51.2 | 45.3 | 2.9 | 18.2 | 32.7 |

| 7000 | 7050 | 7100 | 7150 | 7200 | 7250 | 7300 | 7350 | 7400 | 7450 |
|---|---|---|---|---|---|---|---|---|---|
| 8.02 | 50.2 | 12.7 | 42.2 | 26.7 | 39.5 | 49.7 | 0.3 | 0.49 | 0.31 |
| 8.96 | 38.9 | 21.4 | 25.2 | 11 | 30.5 | 26.8 | 0.2 | 0.09 | 0.07 |
| 7 | 13.8 | 19.9 | 17.2 | 9.06 | 30.6 | 15.9 | 0.29 | 0.04 | 0.09 |
| 5.63 | 3.87 | 3.95 | 4.32 | 8.69 | 10.6 | 18.6 | 0.48 | 0.09 | 0.05 |
| 39.2 | 32.6 | 47.9 | 16.7 | 44.8 | 24.5 | 45.3 | 9.6 | 11.1 | 6.39 |
| 25.7 | 14.5 | 13.6 | 7.97 | 15.6 | 19.1 | 43.2 | 75.3 | 0.04 | 0.08 |
| 33.6 | 25.3 | 13.5 | 7.57 | 9.51 | 15.4 | 33.6 | 0.33 | 0.12 | 0.19 |
| 2.21 | 40.2 | 12.6 | 7.27 | 40.9 | 15.5 | 55.3 | 21.7 | 0.09 | 0.09 |
| 36 | 29.2 | 29.9 | 18.3 | 16.2 | 38 | 40 | 0.34 | 0.05 | 0.09 |
| 19.3 | 19.3 | 10.5 | 30.6 | 43.5 | 52.4 | 17.4 | 0.03 | 0 | 0.07 |
| 16 | 2.9 | 5.13 | 5.36 | 38.7 | 34.4 | 33.1 | 0.46 | 0.34 | 0.43 |

FIG. 7

☐ FRAME (POINT OF TIME) WHICH IS DETERMINED TO STAY (BE SEATED)

| FrameNo | 50 | 100 | 150 | 200 | 250 | 300 | 350 | 400 | 450 | 500 | 550 | 600 | 650 | 700 | 750 | 800 | 850 | 900 |
|---|---|---|---|---|---|---|---|---|---|---|---|---|---|---|---|---|---|---|
| SEAT 1 | 0 | 0.42 | 0 | 0.46 | 0.38 | 0.42 | 0.33 | 20.3 | 42.1 | 42.4 | 10.4 | 11.6 | 7.64 | 24 | 13.7 | 10.6 | 33.4 | 0.9 |
| SEAT 2 | 0.09 | 0.14 | 0.07 | 0.11 | 0.09 | 0.09 | 0.07 | 0.47 | 4.23 | 1.66 | 23.9 | 18.4 | 21.6 | 18.2 | 16.6 | 30.7 | 25.3 | 24 |
| SEAT 3 | 0.05 | 0.04 | 0.16 | 0.23 | 0.13 | 0.04 | 0.2 | 0.11 | 0.23 | 0.23 | 0.2 | 0.22 | 17.8 | 6.75 | 5.9 | 9.87 | 3.72 | 6.71 |
| SEAT 4 | 0.05 | 0.09 | 0.06 | 0.09 | 0.05 | 0.03 | 0.08 | 0.06 | 0.11 | 0.14 | 0.05 | 0 | 0 | 0.17 | 17.8 | 21.6 | 1.71 | 5.2 |
| SEAT 5 | 0 | 0 | 0.3 | 0.2 | 0.15 | 0.3 | 0.2 | 0.35 | 0.2 | 0.15 | 0.1 | 0.15 | 0.05 | 0.2 | 0.25 | 0.3 | 0.05 | 31.5 |
| SEAT 6 | 0 | 0 | 0.08 | 0 | 0.08 | 0.12 | 0.04 | 0.04 | 0.04 | 0.12 | 0.08 | 0.04 | 0 | 0.08 | 0.08 | 0.04 | 0 | 6.76 |
| SEAT 7 | 0 | 0 | 0.21 | 0.12 | 0.21 | 0.14 | 0.14 | 0.07 | 0.12 | 0.12 | 0.16 | 0.12 | 0.12 | 0.21 | 0.07 | 0.12 | 0.09 | 0.16 |

| | 7000 | 7050 | 7100 | 7150 | 7200 | 7250 | 7300 | 7350 | 7400 | 7450 |
|---|---|---|---|---|---|---|---|---|---|---|
| | 2.92 | 0.31 | 0.33 | 0 | 0.4 | 0.4 | 0.41 | 0.41 | 0.46 | 0.4 |
| | 0.34 | 0.13 | 0.11 | 0.09 | 0.11 | 0.07 | 0 | 0.09 | 0.13 | 0.07 |
| | 15.9 | 19.3 | 0.16 | 0.34 | 0.31 | 0.18 | 0.18 | 0.16 | 0.13 | 0.09 |
| | 3.08 | 13.9 | 12.5 | 38.5 | 14.6 | 0 | 0.05 | 0.08 | 0.08 | 0.03 |
| | 47.7 | 36.6 | 6.64 | 13.7 | 44.8 | 49.5 | 0.05 | 0.2 | 0.45 | 0.2 |
| | 72.4 | 48.3 | 21.3 | 19.5 | 16.8 | 25.1 | 23.4 | 63.9 | 0.12 | 0 |
| | 11.7 | 11.7 | 43.8 | 40.7 | 2.58 | 13.8 | 4.78 | 16 | 11.6 | 31.2 |

FIG. 8

| | 7 O'CLOCK | | | | | | 8 O'CLOCK | | | | | | 9 O'CLOCK | | | | | | 13 O'CLOCK | | | | | | |
|---|---|---|---|---|---|---|---|---|---|---|---|---|---|---|---|---|---|---|---|---|---|---|---|---|---|
| | 0 | 10 | 20 | 30 | 40 | 50 | 0 | 10 | 20 | 30 | 40 | 50 | 0 | 10 | 20 | 30 | 40 | 50 | 0 | 10 | 20 | 30 | 40 | 50 | |
| SEAT 1 | 0.0 | 0.1 | 30.9 | 3.7 | 3.7 | 5.8 | 6.9 | 3.0 | 5.2 | 5.5 | 12.9 | 15.5 | 4.0 | 8.4 | 13.3 | 29.5 | 21.3 | 1 | 0.4 | 0.4 | 0.4 | 0.4 | 0.5 | 0.0 | 5.9 |
| SEAT 2 | 10.0 | 0.0 | 81.4 | 7.4 | 63.3 | 1.6 | 82.3 | 80.0 | 11.8 | 39.1 | 100.0 | 99.2 | 78.2 | 30.0 | 76.4 | 89.5 | 10.0 | 8 | 11.6 | 0.0 | 34.7 | 68.5 | 18.7 | 29.1 | 45.6 |
| SEAT 3 | 5.0 | 1.0 | 29.8 | 54.8 | 84.9 | 53.7 | 30.2 | 50.0 | 91.0 | 5.4 | 56.1 | 86.8 | 46.4 | 20.0 | 12.2 | 45.4 | 35.6 | 1 | 84.0 | 1.0 | 86.3 | 21.4 | 75.4 | 40.4 | 49.7 |
| SEAT 4 | 20.0 | 2.0 | 50.6 | 74.5 | 64.1 | 90.2 | 34.8 | 30.0 | 67.8 | 55.0 | 97.7 | 27.0 | 24.6 | 55.0 | 1.2 | 94.4 | 29.0 | 1 | 19.8 | 2.0 | 32.1 | 0.6 | 37.9 | 48.5 | 42.7 |
| SEAT 5 | 30.0 | 3.0 | 99.9 | 16.8 | 100.0 | 22.5 | 83.2 | 30.0 | 22.1 | 100.0 | 99.6 | 87.4 | 25.0 | 60.0 | 76.1 | 4.8 | 68.6 | 1 | 28.2 | 3.0 | 80.6 | 87.8 | 49.0 | 14.2 | 47.6 |
| SEAT 6 | 5.0 | 4.0 | 43.9 | 14.9 | 79.7 | 96.9 | 76.7 | 50.0 | 76.1 | 100.0 | 60.7 | 75.8 | 16.7 | 4.0 | 77.1 | 13.6 | 7.1 | 23 | 57.1 | 4.0 | 62.2 | 66.4 | 61.6 | 36.6 | 43.2 |
| SEAT 7 | 44.9 | 5.0 | 88.2 | 2.0 | 95.8 | 29.4 | 53.9 | 60.0 | 30.6 | 79.6 | 45.4 | 75.5 | 70.3 | 80.0 | 37.0 | 45.7 | 20.6 | 39 | 63.4 | 5.0 | 36.9 | 61.8 | 19.4 | 98.1 | 44.6 |
| SEAT 8 | 62.7 | 6.0 | 17.1 | 45.3 | 6.3 | 21.4 | 89.7 | 70.0 | 80.6 | 52.1 | 100.0 | 20.1 | 23.2 | 100.0 | 49.4 | 25.7 | 27.4 | 8 | 56.2 | 6.0 | 76.7 | 14.3 | 58.5 | 10.9 | 53.3 |
| SEAT 9 | 56.6 | 7.0 | 17.7 | 22.1 | 42.4 | 13.5 | 87.5 | 60.0 | 51.9 | 22.9 | 100.0 | 62.9 | 98.8 | 10.0 | 98.8 | 49.0 | 71.6 | 40 | 22.3 | 7.0 | 79.9 | 48.4 | 28.6 | 3.8 | 40.8 |
| SEAT 10 | 47.8 | 8.0 | 19.7 | 74.8 | 20.0 | 5.7 | 31.8 | 66.0 | 5.3 | 57.3 | 68.8 | 37.5 | 58.5 | 20.0 | 40.5 | 25.2 | 46.8 | 2 | 13.4 | 8.0 | 71.7 | 74.0 | 78.9 | 69.6 | 45.7 |
| SEAT 11 | 70.5 | 9.0 | 21.3 | 86.4 | 72.8 | 63.9 | 13.7 | 55.0 | 29.2 | 93.8 | 51.8 | 76.5 | 3.7 | 30.0 | 86.3 | 3.1 | 27.5 | 7 | 93.7 | 9.0 | 96.0 | 41.7 | 23.4 | 76.7 | 45.7 |
| SEAT 12 | 72.2 | 10.0 | 90.0 | 32.6 | 42.3 | 29.0 | 88.1 | 80.0 | 5.3 | 7.0 | 79.0 | 77.9 | 90.0 | 40.0 | 30.9 | 64.0 | 1.0 | 7 | 0.7 | 10.0 | 30.9 | 98.3 | 34.3 | 71.4 | 50.7 |
| SEAT 13 | 4.2 | 11.0 | 76.0 | 3.4 | 3.7 | 98.7 | 8.5 | 11.0 | 77.6 | 100.0 | 15.3 | 80.0 | 1.9 | 40.0 | 74.6 | 78.0 | 98.0 | 2 | 18.6 | 11.0 | 8.5 | 27.9 | 8.9 | 32.3 | 37.3 |
| SEAT 14 | 0.1 | 12.0 | 98.1 | 83.0 | 45.9 | 42.7 | 85.8 | 12.0 | 48.2 | 82.5 | 90.0 | 54.7 | 42.7 | 80.0 | 74.1 | 49.8 | 20.0 | 8 | 97.7 | 12.0 | 55.1 | 51.3 | 5.1 | 39.7 | 46.0 |
| SEAT 15 | 92.9 | 13.0 | 45.3 | 68.2 | 91.0 | 93.1 | 20.7 | 13.0 | 47.5 | 68.9 | 16.3 | 63.9 | 86.8 | 100.0 | 90.9 | 46.6 | 42.8 | 4 | 84.5 | 13.0 | 38.0 | 51.2 | 48.7 | 28.0 | 48.6 |
| COUNTER 1 | 55.7 | 14.0 | 64.3 | 40.0 | 30.0 | 96.1 | 72.8 | 20.0 | 42.2 | 96.0 | 35.0 | 78.5 | 40.9 | 100.0 | 33.6 | 72.9 | 60.0 | 2 | 1.2 | 14.0 | 60.9 | 43.5 | 68.2 | 48.7 | 58.5 |
| COUNTER 2 | 74.9 | 50.0 | 83.6 | 67.9 | 39.6 | 76.9 | 36.2 | 80.0 | 85.8 | 34.4 | 41.7 | 73.5 | 90.0 | 100.0 | 98.1 | 79.9 | 88.3 | 60 | 14.5 | 1.0 | 16.8 | 32.5 | 74.3 | 40.1 | 64.5 |
| COUNTER 3 | 70.0 | 80.0 | 70.0 | 70.0 | 50.0 | 40.0 | 70.0 | 100.0 | 90.0 | 90.0 | 85.0 | 100.0 | 90.0 | 100.0 | 100.0 | 90.0 | 90.0 | 90 | 87.4 | 13.7 | 0.7 | 24.8 | 41.5 | 0.0 | 70.5 |
| AVERAGE OCCUPANCY DEGREE | 40.1 | 13.1 | 57.1 | 42.7 | 52.0 | 48.4 | 54.0 | 48.3 | 48.2 | 60.5 | 63.9 | 66.2 | 50.1 | 54.3 | 59.3 | 50.5 | 41.1 | 45 | 39.2 | 6.7 | 48.2 | 45.3 | 40.7 | 38.2 | |

NON-SMOKING AREA: SEAT 1 – SEAT 10
SMOKING AREA: SEAT 11 – COUNTER 3

51, 52, 53

AVERAGE OCCUPANCY DEGREE

FIG. 9

| | | 7 O'CLOCK | | | | | | 8 O'CLOCK | | | | | | 9 O'CLOCK | | | | | |
|---|---|---|---|---|---|---|---|---|---|---|---|---|---|---|---|---|---|---|---|
| | | 0 | 10 | 20 | 30 | 40 | 50 | 0 | 10 | 20 | 30 | 40 | 50 | 0 | 10 | 20 | 30 | 40 | 50 |
| NON-SMOKING AREA | AREA 1 | 0.1 | 12.0 | 98.1 | 83.0 | 45.9 | 42.7 | 85.8 | 12.0 | 48.2 | 82.5 | 90.0 | 54.7 | 42.7 | 80.0 | 74.1 | 49.8 | 20.0 | 84 |
| | AREA 2 | 56.6 | 7.0 | 17.7 | 22.1 | 42.4 | 13.5 | 87.5 | 60.0 | 51.9 | 22.9 | 100.0 | 62.9 | 98.8 | 10.0 | 96.6 | 49.0 | 71.6 | 40 |
| | AREA 3 | 5.0 | 1.0 | 29.8 | 54.8 | 84.9 | 53.7 | 30.2 | 50.0 | 91.0 | 5.4 | 56.1 | 86.6 | 46.4 | 20.0 | 12.2 | 45.4 | 35.6 | 88 |
| SMOKING AREA | AREA 4 | 20.0 | 2.0 | 50.6 | 74.5 | 64.1 | 90.2 | 34.8 | 30.0 | 67.8 | 55.0 | 97.7 | 27.0 | 24.6 | 55.0 | 1.2 | 94.4 | 29.0 | 11 |
| | AREA 5 | 55.7 | 14.0 | 64.3 | 40.0 | 30.0 | 96.1 | 72.8 | 20.0 | 42.2 | 96.0 | 35.0 | 78.5 | 40.9 | 100.0 | 33.6 | 72.9 | 60.0 | 20 |
| AVERAGE OCCUPANCY DEGREE | | 27.5 | 7.2 | 52.1 | 54.9 | 53.5 | 59.2 | 62.2 | 34.4 | 60.2 | 52.4 | 75.8 | 61.9 | 50.7 | 53.0 | 43.6 | 62.3 | 43.2 | 49 |

| | 13 O'CLOCK | | | | | | AVERAGE OCCUPANCY DEGREE |
|---|---|---|---|---|---|---|---|
| | 0 | 10 | 20 | 30 | 40 | 50 | |
| AREA 1 | 97.7 | 12.0 | 55.1 | 51.3 | 5.1 | 39.7 | 46.0 |
| AREA 2 | 22.3 | 7.0 | 79.9 | 48.4 | 28.6 | 3.8 | 40.8 |
| AREA 3 | 84.0 | 1.0 | 86.3 | 21.4 | 75.4 | 40.4 | 49.7 |
| AREA 4 | 19.8 | 2.0 | 32.1 | 0.6 | 37.9 | 48.5 | 42.7 |
| AREA 5 | 1.2 | 14.0 | 60.9 | 43.5 | 68.2 | 48.7 | 58.5 |
| | 5.0 | 7.2 | 62.9 | 33.0 | 43.0 | 36.2 | |

FIG. 11

Legend: ▨ FRAME (POINT OF TIME) WHICH HAS VALUE OF EQUAL TO OR GREATER THAN THRESHOLD VALUE

DETERMINATION PERIOD OF TIME

| FrameNo | 50 | 100 | 150 | 200 | 250 | 300 | 350 | 400 | 450 | 500 | 550 | 600 | 650 |
|---|---|---|---|---|---|---|---|---|---|---|---|---|---|
| SEAT 1 | 0.29 | 0.31 | 0.24 | 41.2 | 51.5 | 4.79 | 2.89 | 18.8 | 42.7 | 42.8 | 17.5 | 13.8 | 6.7 |
| SEAT 2 | 0.05 | 0.16 | 0.05 | 0.43 | 35.6 | 15.1 | 6.02 | 11.1 | 28.3 | 19.8 | 12.3 | 28.7 | 28. |
| SEAT 3 | 0.11 | 0.16 | 0.05 | 0.45 | 35.8 | 38.9 | 7.72 | 3.39 | 37.1 | 24.1 | 21.2 | 31 | 2 |
| SEAT 4 | 0.02 | 0.02 | 0.05 | 0.11 | 0.21 | 34.4 | 18.7 | 10 | 25.7 | 11.8 | 10.6 | 13.6 | 7.2 |
| SEAT 5 | 0.2 | 0.2 | 0.15 | 0.3 | 0.2 | 50.8 | 37.4 | 22 | 39.9 | 52.6 | 32.3 | 50 | 47 |
| SEAT 6 | 0 | 0.04 | 0.04 | 0.08 | 0.16 | 69.4 | 19.5 | 29.5 | 41.8 | 55.9 | 49.7 | 31 | 11 |
| SEAT 7 | 0.07 | 0.02 | 0.09 | 0.05 | 0 | 55.4 | 40.1 | 8.25 | 14.1 | 20.9 | 12.7 | 10.9 | 15 |
| SEAT 8 | 0.07 | 0 | 0.07 | 0.07 | 0.02 | 0.36 | 60 | 24.2 | 10.3 | 19.6 | 14.6 | 19.8 | 5.0 |
| SEAT 9 | 0.02 | 0.02 | 0 | 0.05 | 0.05 | 0.49 | 49.8 | 14.2 | 24.1 | 16.9 | 29.3 | 19.6 | 12. |
| SEAT 10 | 0.07 | 0.1 | 0 | 0.07 | 0.07 | 0.17 | 70.6 | 22.9 | 39.1 | 28.5 | 4.14 | 6 | 28.1 |
| SEAT 11 | 0.32 | 0.11 | 0.23 | 0.2 | 0.29 | 0.32 | 42.1 | 11.8 | 51.2 | 45.3 | 21.9 | 18.2 | 32.7 |

| FrameNo | 7000 | 7050 | 7100 | 7150 | 7200 | 7250 | 7300 | 7350 | 7400 | 7450 |
|---|---|---|---|---|---|---|---|---|---|---|
| SEAT 1 | 8.02 | 50.2 | 12.7 | 42.2 | 26.7 | 39.5 | 49.7 | 0.3 | 0.49 | 0.31 |
| SEAT 2 | 8.96 | 38.9 | 2.14 | 25.2 | 11 | 30.5 | 26.8 | 0.2 | 0.09 | 0.07 |
| SEAT 3 | 7 | 13.8 | 19.9 | 17.2 | 9.06 | 30.6 | 15.9 | 0.29 | 0.04 | 0.09 |
| SEAT 4 | 5.63 | 3.87 | 3.95 | 4.32 | 8.69 | 10.6 | 18.6 | 0.48 | 0.09 | 0.05 |
| SEAT 5 | 39.2 | 32.6 | 47.9 | 16.7 | 44.8 | 24.5 | 45.3 | 9.6 | 1.1 | 6.39 |
| SEAT 6 | 25.7 | 14.5 | 13.6 | 7.97 | 15.6 | 19.1 | 43.2 | 7.53 | 0.04 | 0.08 |
| SEAT 7 | 33.6 | 25.3 | 13.5 | 7.57 | 9.51 | 15.4 | 33.6 | 0.33 | 0.12 | 0.19 |
| SEAT 8 | 22.1 | 40.2 | 12.6 | 7.27 | 40.9 | 15.5 | 55.3 | 21.7 | 0.09 | 0.09 |
| SEAT 9 | 36 | 29.2 | 29.9 | 18.3 | 16.2 | 38 | 40 | 0.34 | 0.05 | 0.09 |
| SEAT 10 | 19.3 | 19.3 | 10.5 | 30.6 | 43.5 | 52.4 | 17.4 | 0.03 | 0 | 0.07 |
| SEAT 11 | 16 | 29 | 5.13 | 5.36 | 38.7 | 34.4 | 33.1 | 0.46 | 0.34 | 0.43 |

FIG. 12

| | | | | | | | | | | | PERIOD OF TIME WHICH IS DETERMINED TO STAY (BE SEATED) |

STAY INFORMATION

| | 8:00 | 8:01 | 8:02 | 8:03 | 8:04 | 8:05 | 8:06 | 8:07 | 8:08 | 8:09 | OCCUPANCY DEGREE |
|---|---|---|---|---|---|---|---|---|---|---|---|
| SEAT 1 | ■ | | | | | | | | | | 10 |
| SEAT 2 | ■ | ■ | ■ | ■ | ■ | ■ | ■ | ■ | | | 80 |
| SEAT 3 | ■ | ■ | ■ | | | | | | | | 30 |
| SEAT 4 | | | | | | | | ■ | ■ | ■ | 30 |
| SEAT 5 | | | ■ | ■ | ■ | ■ | ■ | ■ | ■ | | 80 |
| SEAT 6 | ■ | ■ | ■ | ■ | | | ■ | ■ | ■ | ■ | 80 |
| SEAT 7 | ■ | ■ | ■ | ■ | ■ | | | | | | 50 |
| SEAT 8 | | ■ | ■ | ■ | ■ | ■ | ■ | ■ | ■ | ■ | 90 |
| SEAT 9 | ■ | ■ | ■ | ■ | ■ | ■ | ■ | ■ | ■ | | 90 |
| SEAT 10 | | | | | | | ■ | ■ | ■ | | 30 |

FACILITY UTILIZATION MEASUREMENT APPARATUS, FACILITY UTILIZATION MEASUREMENT SYSTEM, AND FACILITY UTILIZATION MEASUREMENT METHOD

BACKGROUND OF THE INVENTION

1. Field of the Invention

The present invention relates to a facility utilization measurement apparatus, a facility utilization measurement system, and a facility utilization measurement method in which utilization of a facility by a user is measured based on an image which is obtained by capturing the inside of the facility.

2. Description of the Related Art

A monitoring system in which a camera capturing the inside of a store is installed and a situation in the store is monitored by using an image of the camera has been widely used in an eating place such as a restaurant and a tea house. However, if utilization of the store is understood by using the image of the camera, for example, if a seat occupancy ratio indicating how many seats there are which is provided in the store occupied is understood, it is possible to consider improvement plans and the like for efficiently operating the store such as a change of a layout of the store, based on the understood seat occupancy ratio. In addition, there is an advantage in that improvement of profitability or sales of the store is achieved.

As a technology associated with such understanding of utilization of the store based on an image, a technology in which a person being seated and a person leaving a seat are determined based on an image and thus a seat occupancy ratio is measured based on the determination result has been known in the related art (see Japanese Patent Unexamined Publication No. 2003-256843). In this technology, a movement line of a customer which comes to the store is detected, and a person being seated and a person leaving a seat are determined based on the detected movement line.

In the technology of the related art, it is determined whether a person is seated or leaves a seat, based on the movement line. However, in a process based on such a movement line, erroneous determination that it is determined to leave a seat even though a state of being seated is maintained, or conversely, that it is determined to be seated even though there is in a state of leaving a seat significantly occurs when the movement line is incompletely detected, or when the movement line is confused with a person who passes by a seat, and thus detection of the person and the movement line are switched. In addition, many errors occur in understanding of utilization of the store, and thus reliability is lack in examination of improvement plans for operating the store.

SUMMARY OF THE INVENTION

According to an embodiment of the present invention, there is provided a facility utilization measurement apparatus which measures utilization of a facility by a user, based on an image obtained by capturing the inside of the facility. The facility utilization measurement apparatus includes an area setter, a stay information generator, a use information generator, and a display information generator. The area setter sets a plurality of determination areas for determining whether a user stays. The stay information generator generates stay information regarding whether the user stays, for each determination area based on a change status of the image in the determination area which is set by the area setter. The use information generator generates use information regarding utilization of each determination area, based on the stay information which is generated by the stay information generator. The display information generator generates display information for displaying the use information which is generated by the use information generator and outputs the generated display information.

BRIEF DESCRIPTION OF DRAWINGS

FIG. 6 is a diagram illustrating an example of an image change ratio acquired by an image change ratio acquirer of a stay information generator;

FIG. 7 is a diagram illustrating an example of the image change ratio acquired by the image change ratio acquirer of the stay information generator;

FIG. 8 a diagram illustrating a measurement result report which is output by a monitor or a printer;

FIG. 9 is a diagram illustrating the measurement result report which is output by the monitor or the printer;

FIG. 11 is a diagram illustrating an outline of processes which are executed by a stay information generator according to a second embodiment; and FIG. 12 is a diagram illustrating stay information which is generated by the stay information generator.

DETAILED DESCRIPTION OF THE PREFERRED EMBODIMENTS

Figure 1:
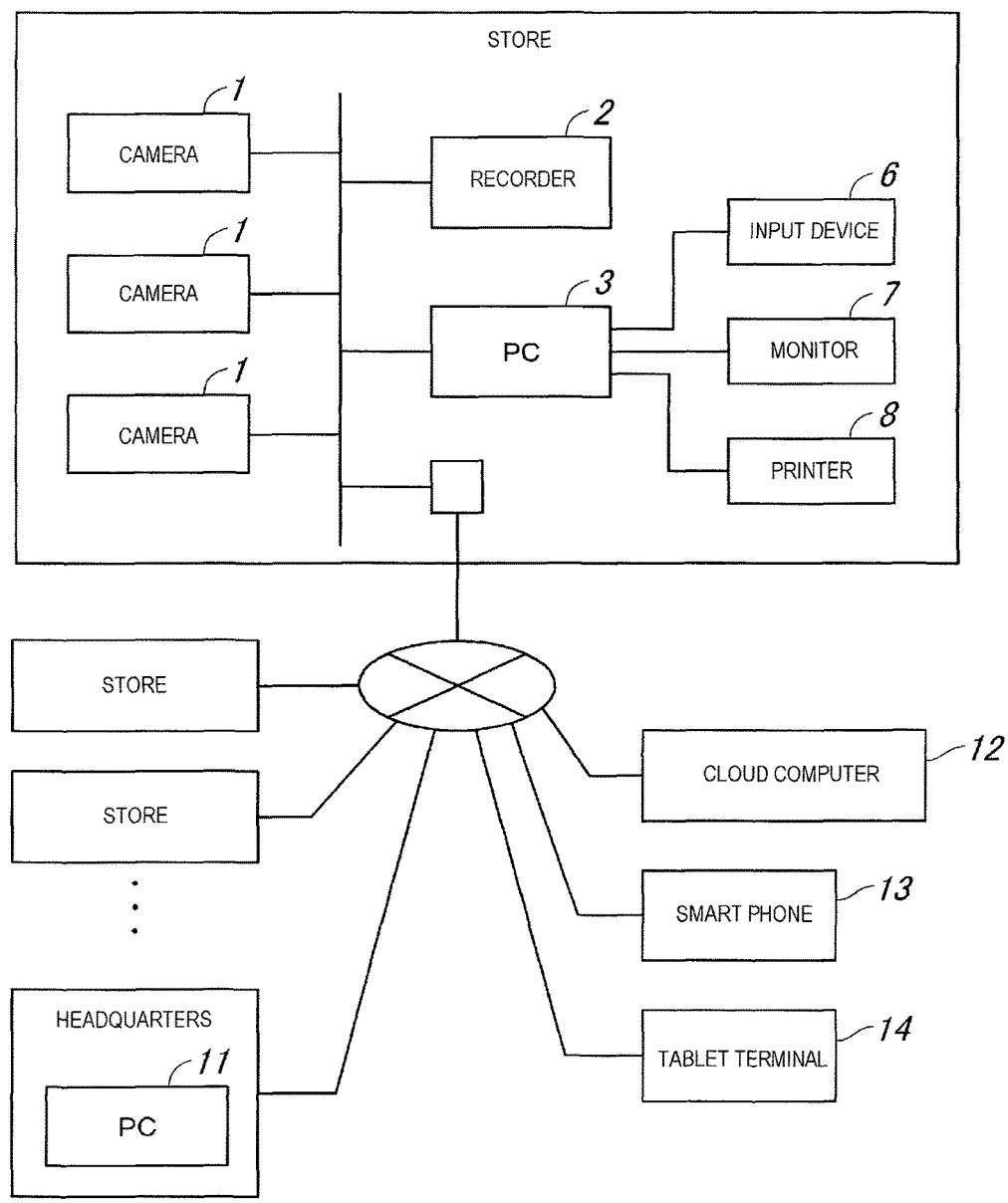
FIG. 1 is the entire configuration diagram of a facility utilization measurement system according to an embodiment.

The present invention is proposed so as to solve such problems of the technology in the related art, and an object of the invention is mainly to provide a facility utilization measurement apparatus, a facility utilization measurement system, and a facility utilization measurement method which are configured so as to enable measurement of utilization of a facility by a user with high accuracy based on an image obtained by capturing the inside of the facility.

According to a first aspect of the invention, there is provided a facility utilization measurement apparatus which measures utilization of a facility by a user, based on an image obtained by capturing the inside of the facility. The facility utilization measurement apparatus includes an area setter, a stay information generator, a use information generator, and a display information generator. The area setter sets a plurality of determination areas for determining whether a user stays. The stay information generator generates stay information regarding whether the user stays, for each determination area based on a change status of the image in the determination area which is set by the area setter. The use information generator generates use information regarding utilization of each determination area, based on the stay information which is generated by the stay information generator. The display information generator generates display information for displaying the use information which is generated by the use information generator and outputs the generated display information.

In this case, since it is determined whether a user stays in the determination area, based on the change status of the image, it is possible to measure the utilization of the facility by the user with high accuracy.

According to a second aspect of the invention, the area setter sets the determination area for each seat when the user is assigned to each seat. The stay information generator generates the stay information regarding whether the user is seated, for each seat. The use information generator generates the use information indicating an occupancy status for each seat, based on the stay information.

In this case, it is possible to cause a user to understand the occupancy status of each seat.

According to a third aspect of the invention, the stay information generator includes an image change ratio acquirer and a stay determinator. The image change ratio acquirer acquires an image change ratio of an image at each point of time in a predetermined sampling period to an image at an immediately previous point of time in the sampling period. The stay determinator determines whether the user stays in the determination area, based on the image change ratio which is acquired by the image change ratio acquirer.

In this case, the image change ratio acquired by performing a comparison to an immediate previous image in the sampling period reflects a movement of a user who is in the determination area. Thus, it is possible to determine whether a user stays in the determination area, with high accuracy.

According to a fourth aspect of the invention, the stay determinator determines whether the user stays in the determination area, based on continuity of the image change ratio at a plurality of points of time in a predefined determination period of time.

In this case, it is possible to avoid an erroneous determination due to a person who simply passes by the determination area and to improve accuracy of determination.

According to a fifth aspect of the invention, the use information generator obtains an occupancy degree indicating that the user stays in each determination area for a predetermined unit time, as the use information.

In this case, since the occupancy degree of each unit time in each determination area is output, it is possible to cause a user to understand the utilization of each unit time in each determination area.

According to a sixth aspect of the invention, the use information generator obtains an average occupancy degree of each determination area by averaging the occupancy degree of each unit time in each determination area during a predetermined aggregate period of time.

In this case, since the average occupancy degree of each determination area which is obtained by using the total aggregate period of time as a target is output, it is possible to cause a user to understand the utilization of each determination area in the total aggregate period of time.

According to a seventh aspect of the invention, the use information generator obtains an average occupancy degree of each unit time by averaging the occupancy degree of each unit time in each determination area, in a plurality of determination areas which is used as an aggregate target.

In this case, since the average occupancy degree of each unit time which is obtained by using a plurality of determination areas as a target is output, it is possible to cause a user to understand the utilization of each unit time in a state where the plurality of determination areas are summed up.

According to an eighth aspect of the invention, the facility utilization measurement apparatus further includes a group setter that sets aggregation groups in order to divide a plurality of determination areas into groups in accordance with an area classification in the facility. The use information generator generates the use information of each aggregation group based on the use information of each determination area.

In this case, since the use information of each aggregation group is output, it is possible to cause a user to understand the utilization in a unit of the aggregation group.

According to a ninth aspect of the invention, there is provided a facility utilization measurement system which measures utilization of a facility by a user based on an image obtained by capturing the inside of the facility. The facility utilization measurement system includes a camera that captures the inside of the facility and a plurality of information processing apparatuses. In the facility utilization measurement system, any one of the plurality of information processing apparatuses includes an area setter, a stay information generator, a use information generator, and a display information generator. The area setter sets a plurality of determination areas for determining whether a user stays. The stay information generator generates stay information regarding whether the user stays, for each determination area based on a change status of the image in the determination area which is set by the area setter. The use information generator generates use information regarding utilization of each determination area, based on the stay information which is generated by the stay information generator. The display information generator generates display information for displaying the use information which is generated by the use information generator.

In this case, similarly to the first aspect of the invention, it is possible to measure the utilization of the facility by the user with high accuracy based on the image obtained by capturing the inside of the facility.

According to a tenth aspect of the invention, there is provided a facility utilization measurement method which causes an information processing apparatus to perform processes of measuring utilization of a facility by a user based on an image obtained by capturing the inside of the facility. The facility utilization measurement method includes setting a plurality of determination areas for determining whether a user stays, on the image, generating stay information regarding whether the user stays for each determination area based on a change status of the image in the determination area, generating use information regarding utilization for each determination area based on the stay information, and generating display information for displaying the use information and outputting the generated display information.

In this case, similarly to the first aspect of the invention, it is possible to measure the utilization of the facility by the user with high accuracy based on the image obtained by capturing the inside of the facility.

Hereinafter, exemplary embodiments according to the present invention will be described with reference to the accompanying drawings.

First Embodiment

FIG. 1 is the entire configuration diagram of a facility utilization measurement system according to an exemplary embodiment. The facility utilization measurement system is constructed by using an eating place such as a restaurant and a tea house, and the like as a target. The facility utilization measurement system includes camera 1, recorder (image accumulation apparatus) 2, and PC (facility utilization measurement apparatus) 3.

Camera 1 is installed at a proper location in a store (facility). The inside of the store is captured by camera 1 and an image obtained by performing capturing is accumulated in recorder 2.

Input device 6, monitor (display apparatus) 7, and printer 8 are connected to PC 3. Input device 6 causes a user such as a store manager to perform various input operations and includes a mouse. Monitor 7 displays a monitoring screen. PC 3 is installed at a proper location in the store. PC 3 allows the user to view an image of the inside of the store, which is captured by camera 1 in a real time by using the monitoring screen which is displayed by monitor 7. PC 3 allows viewing of a past image of the inside of the store, which is recorded by recorder 2.

Camera 1, recorder 2, and PC 3 are installed in each of a plurality of stores. PC 11 is installed in the headquarters which manages the entire plurality of stores. PC 11 allows viewing of an image of the inside of the store, which is captured by camera 1 in real time. PC 11 allows viewing of a past image of the inside of the store, which is recorded by recorder 2. Thus, it is possible to cause the headquarters to check a situation in the store.

PC 3 which is installed in the store is configured as the facility utilization measurement apparatus which measures utilization of the store by a customer (user). PC 3 allows PC 3 itself to view information regarding the utilization of the store which is generated by PC 3. In addition, the information is transmitted to PC 11 which is installed in the headquarters and thus the information is also allowed to be viewed in PC 11. PC 3 and PC 11 are configured as viewing apparatuses which cause information regarding the utilization of the store to be viewed.

Figure 2:
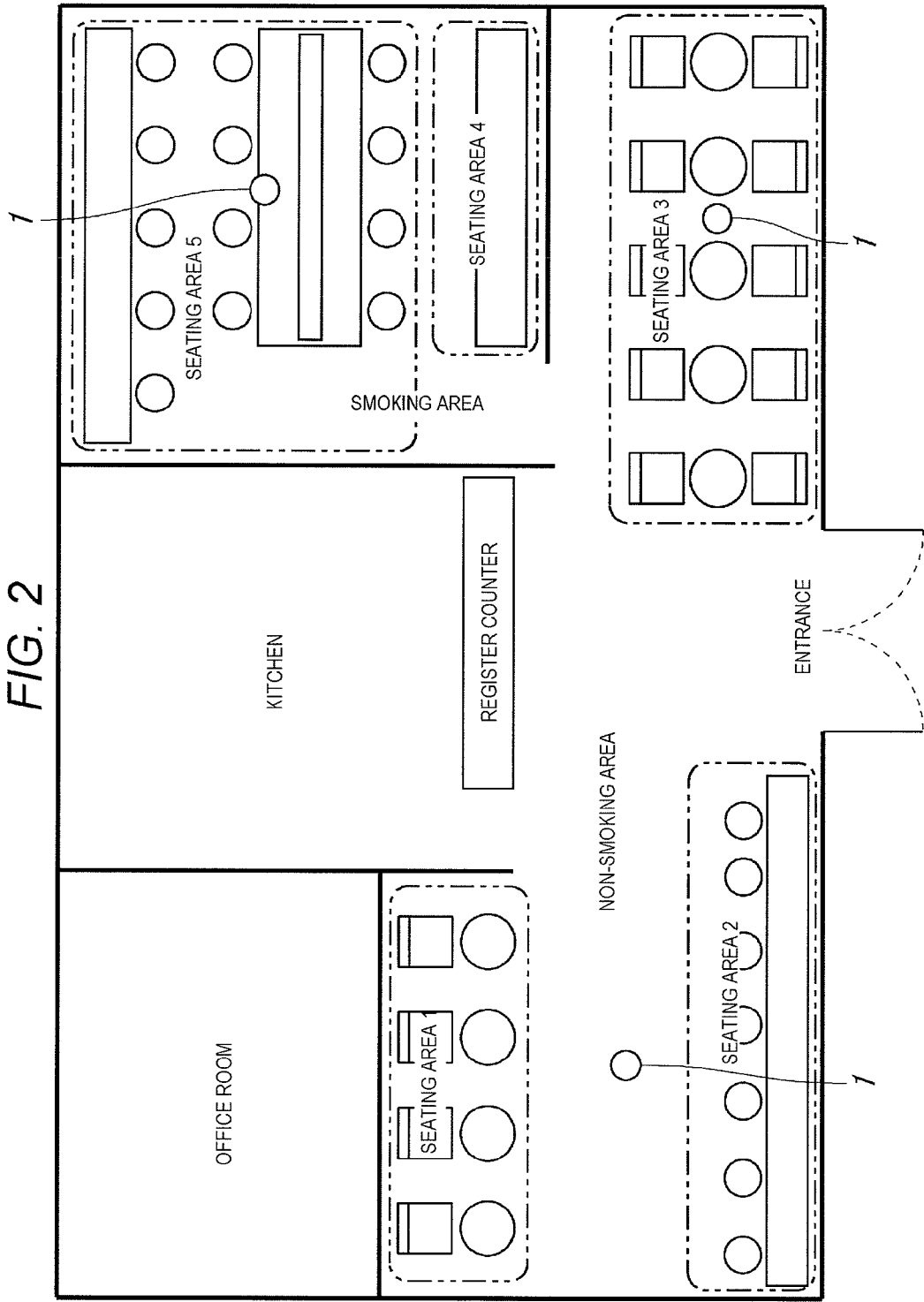
FIG. 2 is a plan view of a store illustrating a layout of the store and an installation situation of a camera.

Next, a layout of the store illustrated in FIG. 1 and an installation situation of camera 1 will be described. FIG. 2 is a plan view of a store illustrating a layout of the store and an installation situation of camera 1.

An entrance, a first to a fifth seating areas, a register counter, a kitchen, an office room, and the like are provided in the store. A table and a chair are disposed in the seating area. The first to a third seating areas are set as non-smoking areas. A fourth seating area and the fifth seating area are set as smoking areas.

A plurality of cameras 1 for capturing the inside of the store is installed in the store. Camera 1 is installed at an appropriate position in the ceiling of the store. Particularly, in the example illustrated in FIG. 2, an omni-directional camera which has a capturing range of 360 degrees by using a fisheye lens is employed to camera 1. Thus, the seating area in the store may be captured by using camera 1.

Figure 3:
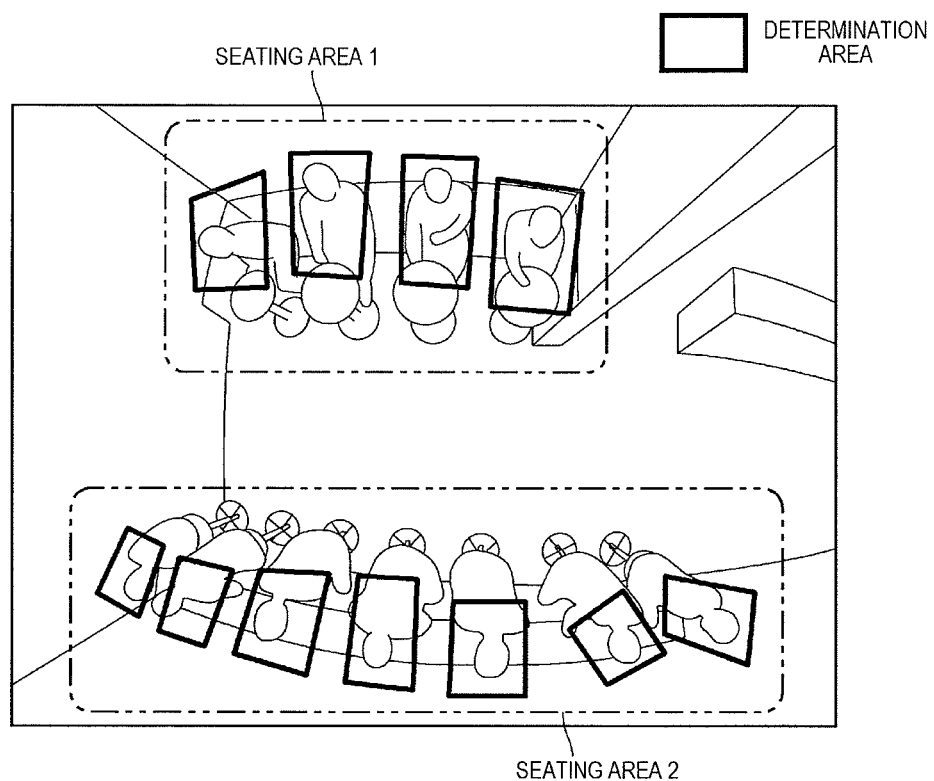
FIG. 3 is a diagram illustrating an example of a determination area which is set on an image captured by the camera.

Next, a determination area which is set on an image captured by camera 1 illustrated in FIG. 1 will be described. FIGS. 3 to 4B are diagrams illustrating an example of the determination area which is set on an image captured by camera 1.

In the first embodiment, a plurality of determination areas is set on an image captured by camera 1, in order to measure the utilization of the store by a customer, particularly, to determine whether or not the customer stays.

FIG. 3 illustrates the first seating area and the second seating area. In the first seating area and the second seating area, a customer is assigned to each seat. That is, a chair which is occupied by one customer is disposed and a position at which a person stays is defined, and thus the determination area may be set in a position at which it is assumed that the body of a person who is currently seated in the chair exists.

Figure 4A:
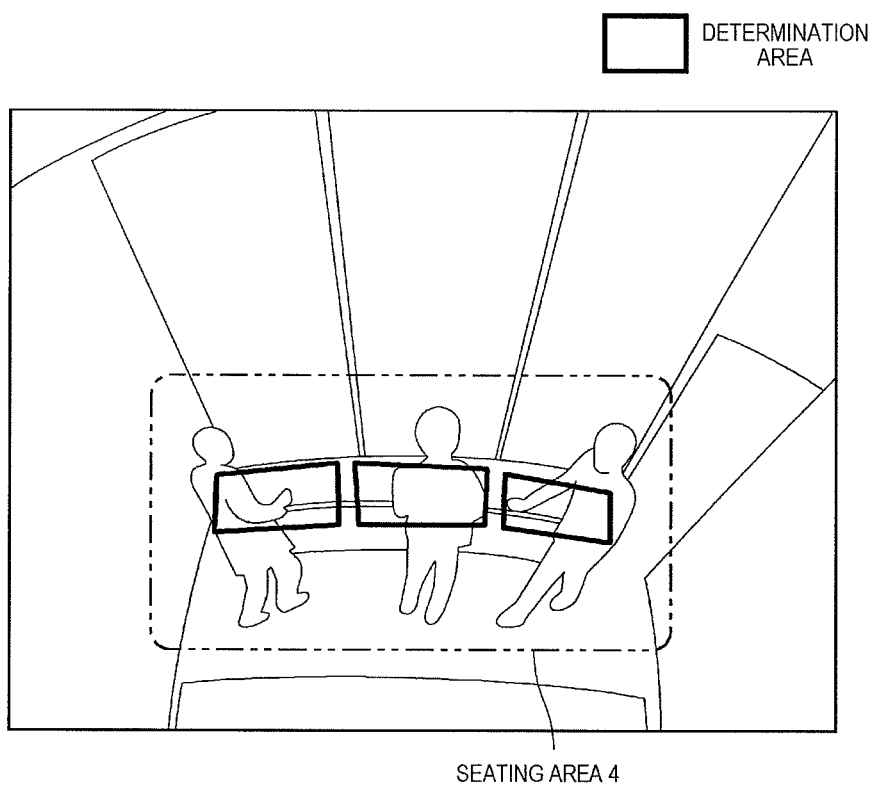
FIG. 4A is a diagram illustrating an example of the determination area which is set on an image captured by the camera.
Figure 4B:
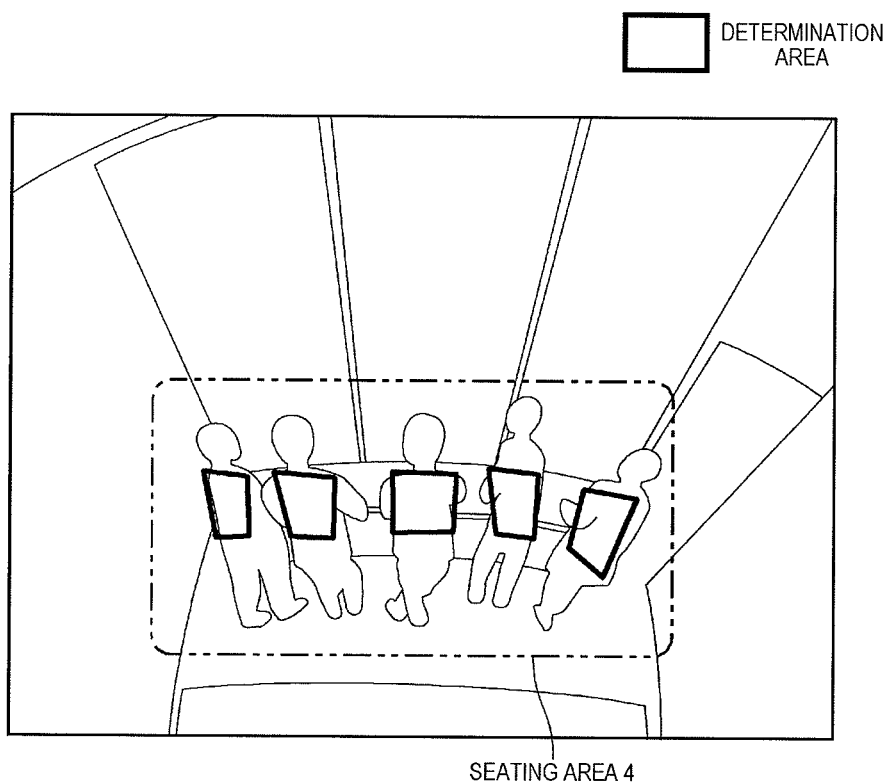
FIG. 4B is a diagram illustrating an example of the determination area which is set on an image captured by the camera.

FIGS. 4A and 4B illustrate the fourth seating area. A standing table (counter) is provided in the fourth seating area. In a case of the standing table, a position at which a person stays is not defined. However, the determination area may be set in a position at which it is assumed that the body of a person who uses the standing table exists.

The determination area may be set by using the size of the body of a person as a reference such that one determination area corresponds to one person. The example illustrated in FIG. 4A represents a case where persons stand at a distance from each other, and three determination areas are set in the vicinity of the standing table. The example illustrated in FIG. 4B represents a case where persons stand close to each other, and five determination areas are set in the vicinity of the standing table.

A case of the third seating area and the fifth seating area is not particularly illustrated. However, in the third seating area and the fifth seating area, each customer may be assigned to a seat, and the determination area may be set, similarly to the first and the second seating areas illustrated in FIG. 3.

A form (position, size, and shape) of the determination area may be appropriately set by a user. Particularly, if a measurement result is compared to an actual situation and the form of the determination area is adjusted, it is possible to improve accuracy of measurement. In the examples of FIGS. 3 to 4B, the determination area is quadrangular. However, the shape of the determination area is not limited to a quadrangle, and may be a polygon, a circle, or the like. In addition, the determination area may be allowed to have any shape.

Figure 5:
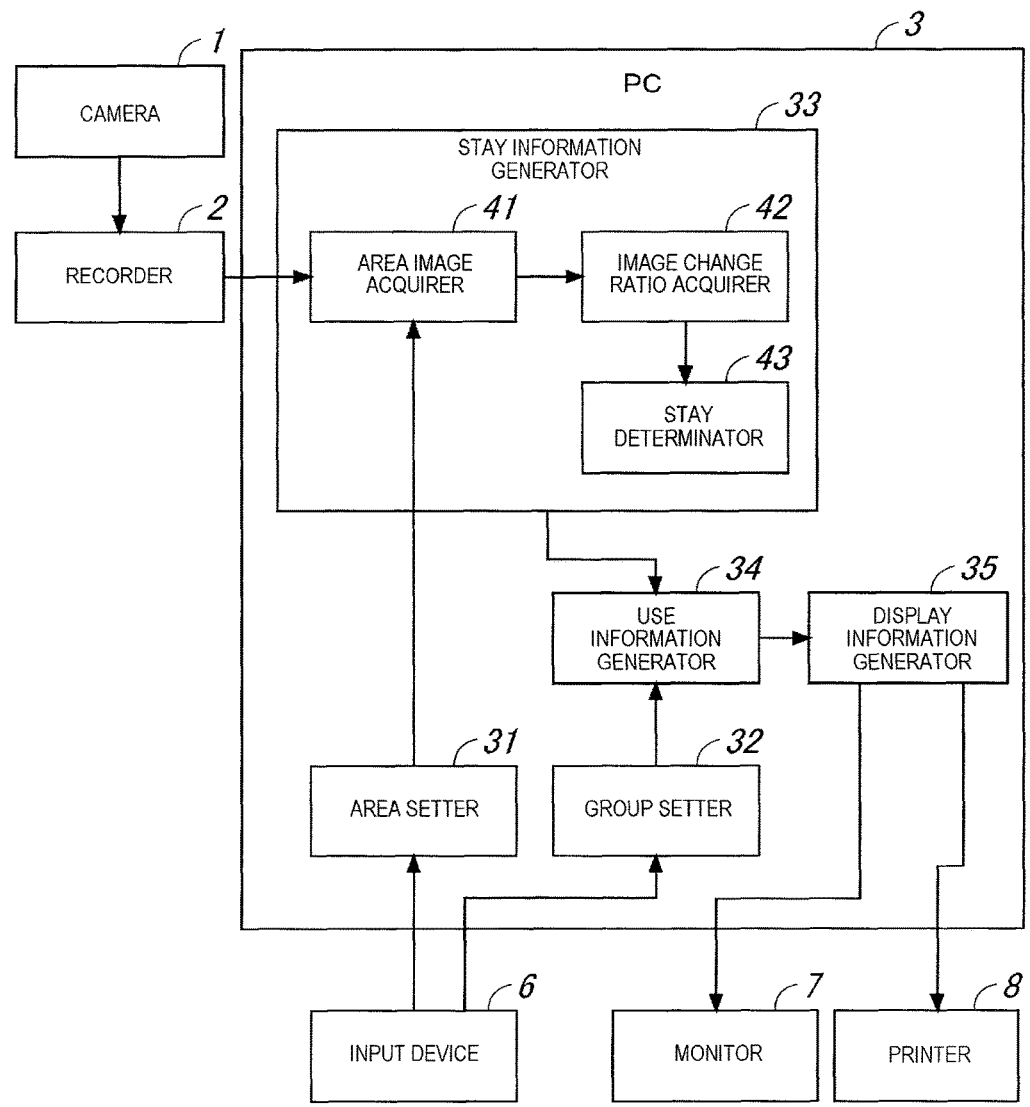
FIG. 5 is a functional block diagram illustrating a schematic configuration of a PC.

Next, facility utilization measurement processing which is executed by PC 3 illustrated in FIG. 1 will be described. FIG. 5 is a functional block diagram illustrating a schematic configuration of PC 3.

PC 3 includes area setter 31, group setter 32, stay information generator 33, use information generator 34, and display information generator 35.

In area setter 31, a process of setting the plurality of determination area (see FIGS. 3 to 4B) for determining whether a customer stays, on an image is executed in accordance with an input operation of a user. In this process, an area setting screen for displaying an image obtained from camera 1 or recorder 2 is displayed on monitor 7. An operation of inputting a position of an area on the image may be performed on the area setting screen by the user using input device 6 such as a mouse.

In group setter 32, a process of setting an aggregation group is executed in accordance with an input operation of the user. The aggregation group is used for dividing the plurality of determination areas into groups in accordance with an area classification in the store. In the first embodiment, the first to the fifth seating areas (see FIG. 2) are set in the store, and the determination areas are divided into five aggregation groups so as to correspond to the first to the fifth seating areas.

Stay information generator 33 generates stay information regarding whether a customer stays, for each determination area based on a change status of an image in the determination area which is set by area setter 31. Stay information generator 33 includes area image acquirer 41, image change ratio acquirer 42, and stay determinator 43.

In area image acquirer 41, an image captured by camera 1 is acquired from recorder 2, and a process of cutting an image of the determination area from the acquired image is executed. In the first embodiment, an image of the determination area is acquired by using an image at each point of time in a predetermined sampling period (for example, 5 seconds) as a target.

In image change ratio acquirer 42, a process of acquiring an image change ratio for an image of the determination area which is acquired by area image acquirer 41 is executed. In the first embodiment, the current image is compared to an image at an immediately previous point of time in the sampling period and the image change ratio of the current image to the image at the immediately previous point of time is acquired. In stay determinator 43, a process of determining whether a customer stays in the determination area, based on the image change ratio which is acquired by image change ratio acquirer 42 is executed. In stay information generator 33, stay information indicating whether a customer stays at each point of time in the sampling period is generated based on a determination result of stay determinator 43.

In the determination area which is set for each seat, the stay information indicates distinguishment between being seated and leaving of a seat in each seat. The stay information may be generated based on a value (below referred to as an occupancy degree) obtained by averaging a plurality of image change ratios of each sampling period which are obtained in a predetermined unit time, in addition to the sampling period.

In use information generator 34, a process of generating use information regarding utilization of each determination area based on the stay information which is generated by stay information generator 33 is executed. In the first embodiment, a process of acquiring the stay information which is obtained based on the occupancy degree in each determination area for each unit time (for example, 10 minutes), as the use information and aggregating of the occupancy degree under a predetermined aggregation condition (each seat or each time zone) is executed. Accordingly, it is possible to understand an occupancy status of each seat or each time zone occurring by a customer staying.

Particularly, in use information generator 34, a process of generating use information of each aggregation group, that is, generating use information for each of the first to the fifth seating areas based on the use information of each determination area is executed. In the first embodiment, the occupancy degree of each determination area is aggregated in a unit of the seating area and thus an occupancy degree of each seating area is obtained. Particularly, in the first embodiment, the occupancy degree of each determination area is averaged in the unit of the seating area, and thus an average occupancy degree for each seating area is obtained. Occupancy degrees of all the determination areas are averaged in a unit of the time zone, and thus an average occupancy degree for each time zone is obtained.

In display information generator 35, a process of generating display information and outputting the generated display information is executed. The display information is used for displaying the use information which is generated by use information generator 34. In the first embodiment, display information regarding a measurement result report (see FIGS. 8 and 9) is generated. The measurement result report is output to monitor 7 so as to be displayed, and is output so as to be printed by printer 8.

PC 3 illustrated in FIG. 5 includes a processor (CPU) and a program memory. The CPU of PC 3 executes a program for measuring facility utilization (instruction), and thereby each unit of PC 3 is realized. The program may be stored in PC 3 which is used as an information processing apparatus, in advance so as to constitute a dedicated apparatus. In addition, the program may be recorded in a proper program recording medium, as an application program which is operated on a general OS, and the program may be provided for the user through a network.

Next, the process which is executed by stay information generator 33 illustrated in FIG. 5 will be described. FIGS. 6 and 7 are diagrams illustrating an example of image change ratios which are acquired by image change ratio acquirer 42 of stay information generator 33.

FIGS. 6 and 7 illustrate the image change ratio (%) at each point of time in each determination area (seat), in a list. FIGS. 6 and 7 illustrate a result of performing measurement in the determination area which is set for each seat. In FIGS. 6 and 7, the determination area is represented by a seat number. FIG. 6 illustrates a measurement result obtained in a situation in which persons are respectively seated on seats at the substantially same time. FIG. 7 illustrates a measurement result obtained in a situation in which persons are subsequently seated on seats.

In the first embodiment, in image change ratio acquirer 42, a process of acquiring the image change ratio is executed. The image change ratio is a change ratio of an image (frame) of the determination area at each point of time in the predetermined sampling period (for example, 5 seconds) to an image at an immediately previous point of time in the sampling period. In stay determinator 43, a process of determining whether a customer stays in the determination area, based on the image change ratio which is acquired by image change ratio acquirer 42 is executed. The stay information in which whether a customer stays is indicated by a presence or absence of coloring for each frame (point of time) in FIGS. 6 and 7 is obtained.

In the examples illustrated in FIGS. 6 and 7, the image change ratio is acquired by setting a frame rate to 10 fps and setting frames at a 50 frame number (FrameNo) interval, as a target. That is, the sampling period is set to 5 seconds and the image change ratio is acquired at an interval of 5 seconds. The image change ratio is a change ratio of the current image with respect to an image at 5 seconds before.

Here, the image change ratio indicates how many pixels have significant change between images of the determination area. Specifically, an image of the determination area is compared to another image of the same determination area for each pixel, and a ratio of the number of pixels having a significant change to the total number of pixels is set as the image change ratio. When the image change ratio is calculated, a change quantity of a pixel value (for example, luminance) is compared to a predetermined threshold value. When the change quantity of the pixel value exceeds the threshold value, the corresponding pixel may be determined to be a pixel in which a significant change appears.

In the first embodiment, in stay determinator 43, the image change ratio which is acquired by image change ratio acquirer 42 is compared to a predetermined threshold value (for example, 0.5%), and it is determined whether a customer stays in the determination area. That is, when the image change ratio is equal to or greater than the threshold value, it is determined that the customer stays in the determination area. When the image change ratio is less than the threshold value, it is determined that the customer does not stay in the determination area.

Here, the image change ratio reflects movement of the body of a person who is in the determination area. The body of a person has slightly moved even though the person is seated on a seat. Thus, if the person is in the determination area, a change in an image appears depending on movement of the body of the person, and the image change ratio becomes greater as the movement of the body of the person becomes greater. For this reason, determination of whether a customer stays in the determination area is enabled by using the size of the image change ratio. In addition, using of the determination result as stay information of the customer is enabled. A large change appears between images which are separate from each other in time due to an influence of a change of the outside light which is introduced from a window, and the like, even in a situation in which there is no person. However, since avoidance of such an influence of the change of the outside light and the like is enabled between images which are close to each other in time, it is possible to determine whether a person stays in the determination area, with high accuracy.

In the examples illustrated in FIGS. 6 and 7, the sampling period is set to 5 seconds. However, the sampling period is not limited to 5 seconds, and may be set to 1 minute or 2 minutes, for example. Since there is no influence by the change of the outside light in a case of a room which has no window, the sampling period may be set to be long.

The threshold value of the image change ratio is set to 0.5%, for example. However, the threshold value may be appropriately set by a user. Particularly, if a determination result is compared to an actual situation, and thus the threshold value is adjusted, it is possible to improve accuracy of determination.

Next, processes which are executed by use information generator 34 and display information generator 35 illustrated in FIG. 5 will be described. FIGS. 8 and 9 are diagrams illustrating a measurement result report which is output by monitor 7 or printer 8. In the measurement result report illustrated in FIGS. 8 and 9, the stay information is acquired based on the occupancy degree of each unit time (for example, 10 minutes) as described above, and a cell of the unit time, which corresponds to the obtained stay information is colored. Thus, reflection of the stay information is performed.

In the first embodiment, in use information generator 34, a process of acquiring the stay information based on the stay information which is generated by stay information generator 33, that is, the occupancy degree of each unit time (for example, 10 minutes) in each determination area is executed. In use information generator 34, a process of aggregating the occupancy degree of each unit time in each determination area under the predetermined aggregation condition is executed. In display information generator 35, the process of generating display information for displaying the use information which is generated by use information generator 34 is executed. Accordingly, the measurement result report illustrated in FIGS. 8 and 9 is output by monitor 7 or printer 8.

The occupancy degree and an average value of occupancy degrees are described in the report illustrated in FIG. 8, in a manner of a list. Occupancy degree description space 51, first average value description space 52, and second average value description space 53 are provided in the report. A cell in which a numerical value of 0 to 50 is described at each time zone (7 o'clock to 13 o'clock) represents the unit time. For example, a cell of "0" of 7 o'clock represents the unit time of 7:00:00 to 7:09:59.

The occupancy degree of each unit time (here, 10 minutes) in each determination area is described in occupancy degree description space 51. Here, when the determination area is set for each seat, the determination area is indicated by the seat number. Regarding the determination area which does not include a seat, that is, the standing table (counter) of the fourth seating area, a determination area number (counter 1 to 3) is described.

The average occupancy degree of each determination area in the total aggregate period of time is described in first average value description space 52. The average occupancy degree of each determination area in the total aggregate period of time is obtained by averaging the occupancy degree of each unit time in each determination area during a predetermined aggregate period of time (here, 7 o'clock to 13 o'clock).

The average occupancy degree of each unit time which is obtained by using all determination areas as a target is described in second average value description space 53. The average occupancy degree of each unit time which is obtained by using all determination areas as a target is obtained by averaging the occupancy degree of each determination area for each unit time in all seating areas.

Occupancy degree description space 61, first average value description space 62, and second average value description space 63 are provided in the report illustrated in FIG. 9.

The occupancy degree of each unit time in each of the first to the fifth seating areas is described in occupancy degree description space 61. The occupancy degree of each unit time in each seating area is obtained by averaging the occupancy degree of each unit time in each determination area by a unit of the seating area. Averaging by a unit of the seating area means that the plurality of determination areas which belong to each seating area is equalized as the aggregate target.

The average occupancy degree of each seating area in the total aggregate period of time is described in first average value description space 62. The average occupancy degree of each seating area in the total aggregate period of time is obtained by averaging the occupancy degree of each unit time in each seating area in the predetermined aggregate period of time (7 o'clock to 13 o'clock).

The average occupancy degree of each unit time which is obtained by using all seating areas as a target is described in second average value description space 63. The average occupancy degree of each unit time which is obtained by using all seating areas as a target is obtained by averaging the occupancy degree of each seating area for each unit time in all seating areas.

In the first embodiment, in display information generator 35, a process of changing a display form for the occupancy degree in accordance with the size of the occupancy degree is executed. In the examples illustrated in FIGS. 8 and 9, a display color (color of being used in filling) of a cell in which the occupancy degree is described is changed in accordance with the size of the occupancy degree. Specifically, the occupancy degree becomes greater and the display color becomes thicker. Accordingly, it is possible to distinguish between highs and lows of the occupancy degree with a single glance.

In the examples illustrated in FIGS. 8 and 9, the color with which a cell is filled is changed. However, a letter attribute such as the display color of a letter for indicating the occupancy degree and the size of the letter may be changed.

In the example illustrated in FIG. 9, the average occupancy degree is obtained by using the first to the fifth seating areas as the aggregate target. However, the average occupancy degree may also be obtained by using the non-smoking area or the smoking area as the aggregate target.

Figure 10A:
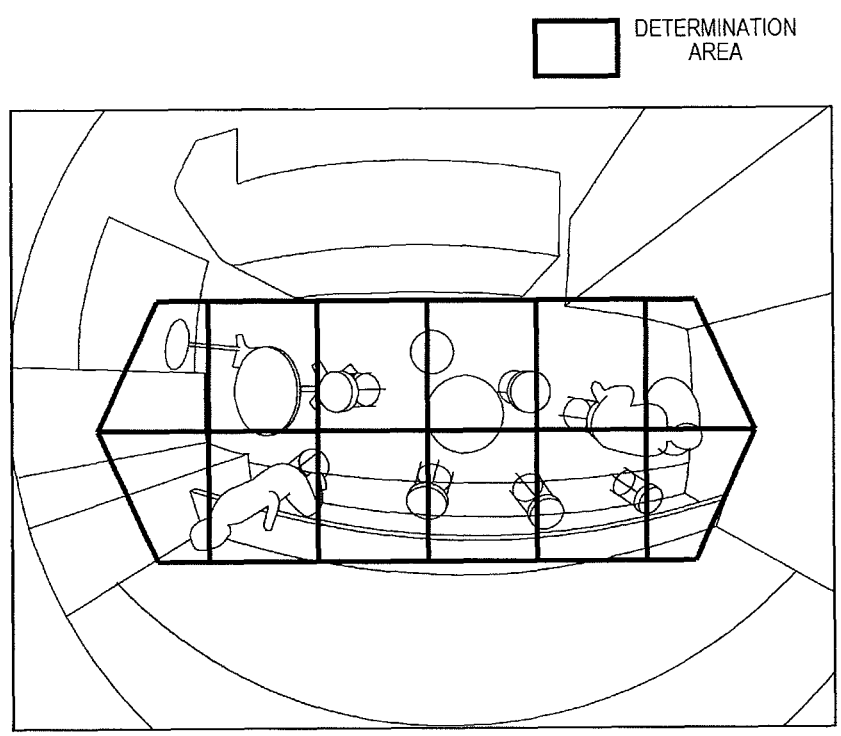
FIG. 10A is a diagram illustrating another example of the determination area which is set on the image captured by the camera.
Figure 10B:
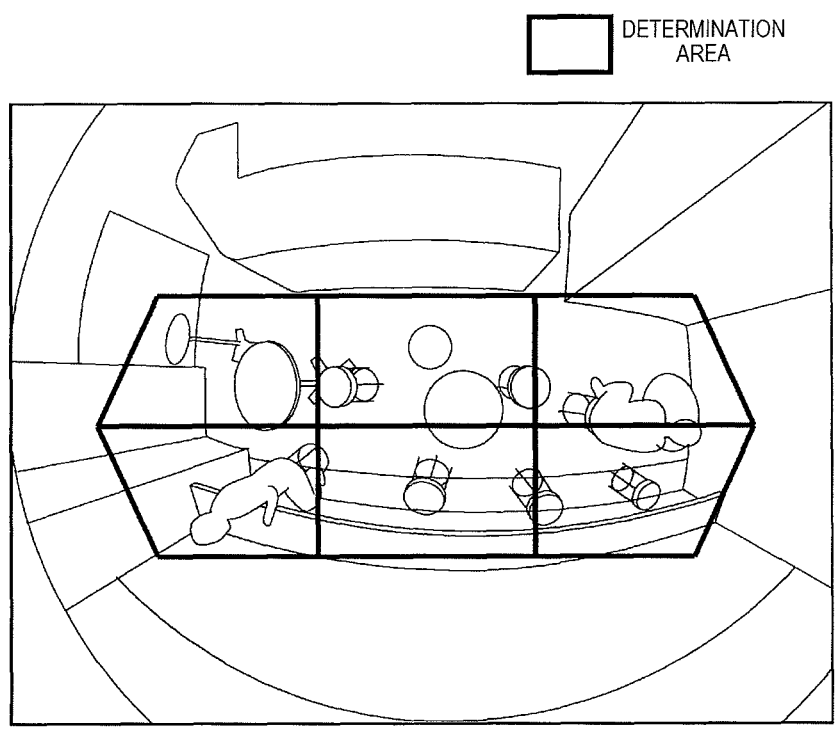
FIG. 10B is a diagram illustrating still another example of the determination area which is set on the image captured by the camera.

Next, another example of the determination area which is set on an image captured by camera 1 will be described. FIGS. 10A and 10B are diagrams illustrating another example of the determination area which is set on an image captured by camera 1.

In the examples illustrated in FIGS. 10A and 10B, a stationary counter type table, a movable circular table, and a movable chair are disposed on a floor. Here, the table or the chair is movable and thus can be freely moved by a customer, and a position of a seat is not fixed. Thus, a position at which a customer stays is not defined, similarly to a case of the standing table (counter) illustrated in FIGS. 4A and 4B. For this reason, the determination area is set in such a manner that an area which has probability of a customer staying is set and separation is performed by using a division line for the set area.

Particularly, in the example illustrated in FIG. 10A, six determination areas are set around the counter type table and six determination areas are set around the circular table. In the example illustrated in FIG. 10B, three determination areas are set around the counter type table and three determination areas are set around the circular table.

In the examples illustrated in FIGS. 3 to 4B, the determination areas are set to be not contact with each other. However, in the examples illustrated in FIGS. 10A and 10B, the determination area are set by performing separation with the division line, and the determination areas are in a state of being contact with each other.

In the above-described embodiment, in area setter 31, the plurality of determination areas for determining whether a customer stays are set on an image. In stay information generator 33, the stay information regarding whether the customer stays is generated for each determination area based on the change status of the image in the determination area. In use information generator 34, the use information regarding the utilization of each determination area is generated based on the stay information which is generated by stay information generator 33. In display information generator 35, the display information for displaying the use information which is generated by use information generator 34 is generated and output. Since it is determined whether a customer stays in the determination area, based on the change status of an image, it is possible to measure the utilization of a store by a customer with high accuracy.

In the first embodiment, when each customer is assigned to a seat, area setter 31 sets the determination area for each seat. Stay information generator 33 generates the stay information regarding whether the customer stays, for each seat. Use information generator 34 generates the use information indicating the occupancy status of each seat, based on the stay information. Accordingly, it is possible to cause a user to understand the occupancy status of each seat.

In the first embodiment, in image change ratio acquirer 42 of stay information generator 33, the image change ratio of an image at each point of time in the predetermined sampling period to an image at an immediately previous point of time in the sampling period is acquired. In stay determinator 43, it is determined whether a customer stays in the determination area, based on the image change ratio which is acquired by image change ratio acquirer 42. The image change ratio acquired by performing comparison with an immediate previous image in the sampling period reflects a movement of a user who is in the determination area. Thus, it is possible to determine whether a user stays in the determination area, with high accuracy.

In the first embodiment, in use information generator 34, the occupancy degree indicating a ratio of a customer staying for the predetermined unit time in each determination area is obtained as the use information, and the occupancy degree of each unit time in each determination area is output. Accordingly, it is possible to cause a user to understand the utilization of each unit time in each determination area.

In the first embodiment, in use information generator 34, the average occupancy degree in each determination area is obtained by averaging the occupancy degree of each unit time in each determination area for the predetermined aggregate period of time, and the average occupancy degree in each determination area obtained by using the total aggregate period of time as a target is output. Accordingly, it is possible to cause a user to understand the utilization of each determination area in the total aggregate period of time.

In the first embodiment, in use information generator 34, the average occupancy degree of each unit time is obtained by averaging the occupancy degree of each unit time in each determination area, in the plurality of determination areas which is used as an aggregate target, and the average occupancy degree of each unit time obtained by using the plurality of determination areas as a target is output. Accordingly, it is possible to cause a user to understand the utilization of each unit time in a state where the plurality of determination areas are summed up.

In the first embodiment, in group setter 32, aggregation groups for dividing a plurality of determination areas into groups in accordance with an area classification in the store are set. In use information generator 34, the use information of each aggregation group is generated based on the use information in each determination area, and the use information of each aggregation group is output. Accordingly, it is possible to cause a user to understand the utilization in a unit of the aggregation group.

Second Embodiment

Next, a second embodiment will be described. Points which are not disclosed in the second embodiment are similar to those in the first embodiment.

FIG. 11 is a diagram illustrating an outline of processes which are executed by a stay information generator 33 according to a second embodiment; and FIG. 12 is a diagram illustrating stay information which is generated by the stay information generator 33.

In the first embodiment, in stay determinator 43 of stay information generator 33, the image change ratio of images (frame) of points of time in the predetermined sampling period (for example, five seconds) is acquired and it is determined whether a customer stays, by using the image change ratio or the occupancy degree which is obtained by averaging the plurality of image change ratios. However, in the second embodiment, as illustrated in FIG. 11, it is determined whether a customer stays, based on continuity of the plurality of image change ratios of points of time in a predetermined determination period of time (for example, 1 minute). Thus, in stay information generator 33, as illustrated in FIG. 12, only stay information indicating whether a customer stays is generated for each determination period of time.

Particularly, in the second embodiment, when the image change ratio of each point of time in the predetermined determination period of time is compared to a predetermined threshold value (for example, 0.5%), and when it is detected that a state where the image change ratio is equal to or greater than the threshold value continues for the determination period of time (at least two times), it is determined that the customer stays, and otherwise, it is determined that the customer does not stay.

In the example illustrated in FIG. 11, the sampling period when the image change ratio is acquired is set to 5 seconds and the determination period of time when it is determined whether a customer stays is set to 1 minute. Thus, it is determined whether a customer stays, based on continuity of 12 image change ratios. If the unit time when the occupancy ratio is obtained by use information generator 34 is set to 10 minutes, the occupancy degree is obtained based on pieces of stay information for ten determination periods of time. FIG. 12 illustrates an example of 10 determination periods of time (8:00:00 to 8:00:59, 8:01:00 to 8:01:59, . . . ) which are included in the unit time of 8:00 (8:00:00 to 8:09:59). Actually, use information generator 34 generates use information by using a date unit as the unit time for understanding the utilization of the facility. The occupancy ratio (%) during a period of time from a start of an operation to an end of the operation is described in a measurement result report.

In the examples illustrated in FIGS. 11 and 12, the determination period of time is set to 1 minute. However, the determination period of time is not limited to 1 minute and may be set to 2 minutes, or a period of time longer than 2 minutes, for example. The determination period of time may be appropriately set by a user. Particularly, when a determination result is compared to an actual situation, and thus the length of the determination period of time is adjusted, it is possible to improve accuracy of determination.

In the above-described embodiment, in stay determinator 43, it is determined whether a customer stays in the determination area, based on the continuity of the plurality of image change ratios of points of time in the predetermined determination period of time. Thus, it is possible to avoid an erroneous determination due to a person who simply passes by the determination area and to improve accuracy of determination. Here, when a person simply passes by the determination area, a period of time during which the person stays in the determination area is substantially several seconds. The continuity of the image change ratios in the determination period of time is considered, and thus it is possible to avoid an erroneous determination due to the person who simply passes by the determination area.

Hitherto, descriptions of the present invention are made based on specific exemplary embodiments. However, these exemplary embodiments are only examples, and the present invention is not limited to these exemplary embodiments. The facility utilization measurement apparatus, the facility utilization measurement system, and the facility utilization measurement method according to the present invention, which are described in the exemplary embodiments are not required to have all components, and the components may be appropriately selected without departing from at least a scope of the present invention.

For example, in these exemplary embodiments, an example of an eating place such as a tea house and a restaurant is described. However, it is not limited to the eating place, and other facilities other than the store may be applied. For example, a seat for a user is provided in a public facility, an event site, or the like. Thus, understanding of an occupancy status of a seat by using utilization of such a facility is advantageous. When a user stays in an area which is provided in a facility and in which various pieces of equipment or various goods are disposed in addition to a seat, it is possible to understand utilization of the facility by using a stay situation of a user in a predetermined area.

In the above exemplary embodiments, as illustrated in FIG. 2, an omni-directional camera which has a capturing range of 360 degrees by using a fisheye lens is used as camera 1. However, a camera having a predetermined angle of view, that is, a so-called box camera may be also used as camera 1.

In these exemplary embodiments, in image change ratio acquirer 42, the current image is compared to an image of an immediately previous point of time in the predetermined sampling period, and thus the image change ratio is acquired. However, the current image may be compared to an image which is used as a preset reference, for example, an image which is captured in a state where a person does not exist, or an image which is obtained by removing an area of a person based on a plurality of images and thus has only a background, and thus the image change ratio may be acquired.

In the above exemplary embodiments, PC 3 which is provided in the store executes processes necessary for measuring facility utilization. However, these necessary processes may be executed by PC 11 which is provided in the headquarters as illustrated in FIG. 1, or cloud computer 12 which constitutes a cloud computing system. The necessary processes may be distributed to a plurality of information processing apparatuses, and information may be transmitted and received between the plurality of information processing apparatuses through a communication medium such as an IP network and an LAN. In this case, the facility utilization measurement system is configured by the plurality of information processing apparatuses which share the necessary processes.

Particularly, in a system configuration which includes cloud computer 12, displaying of necessary information in a portable terminal such as smart phone 13 or tablet terminal 14, which is connected to cloud computer 12 through a network, in addition to PC 3 and PC 11 which are provided in the store and the headquarters may be enabled. Accordingly, it is possible to check the necessary information at any place such as a visiting destination in addition to the store and the headquarters.

In these exemplary embodiments, recorder 2 for accumulating images from camera 1 is installed in the store. However, when the processes necessary for measuring facility utilization are executed by PC 11 which is installed in the headquarters, or cloud computer 12, the images from camera 1 may be transmitted to the headquarters, an operation facility of the cloud computing system, or the like, and thus may be accumulated in the headquarters, an apparatus which is installed in the operation facility of the cloud computing system, or the like.

In these exemplary embodiments, the processes necessary for measuring facility utilization are executed by PC 3 which is installed in the store, and the area setting screen or a measurement result display screen is displayed on monitor 7 of PC 3, and thus a necessary input and output is performed through PC 3. However, the necessary input and output may be performed through an information processing apparatus other than the information processing apparatus which executes the processes necessary for measuring facility utilization, for example, PC 11 which is installed in the headquarters, or a portable terminal such as tablet terminal 14.

The facility utilization measurement apparatus, the facility utilization measurement system and the facility utilization measurement method according to the present invention have an advantage in that it is possible to measure the utilization of the facility by a user with high accuracy, based on an image obtained by capturing the inside of the facility, and are helpful as a facility utilization measurement apparatus, a facility utilization measurement system, a facility utilization measurement method, and the like which measure utilization of a facility by a user, based on an image obtained by capturing the inside of the facility.

What is claimed is:

1. A facility utilization measurement apparatus which measures utilization of a facility by a user, based on an image obtained by capturing the inside of the facility, the apparatus comprising:
   a processor;
   a memory that stores an instruction; and
   a configuration for causing the processor to execute the instruction including,
      an area setter that sets, for each seat when each user is assigned to the seat, a determination area of a plurality of determination areas for determining whether a user stays, on the image,
      a stay information generator that generates, for each seat, stay information regarding whether the user is seated or unseated, for each determination area based on a change status of the image in the determination area which is set by the area setter,
      a use information generator that generates use information indicating either of a seated or unseated occupancy status for each seat, based on the stay information for each determination area, based on the stay information which is generated by the stay information generator, such that the use information generator avoids erroneously generating use information indicating the seated occupancy status of a user passing by the determination area, and
      a display information generator that generates display information for displaying the use information which is generated by the use information generator and outputs the generated display information.

2. The facility utilization measurement apparatus of claim 1, wherein
   the stay information generator includes
      an image change ratio acquirer that acquires an image change ratio of an image at each point of time in a predetermined sampling period to an image at an immediately previous point of time in the sampling period, and
      a stay determinator that determines whether the user stays in the determination area, based on the image change ratio which is acquired by the image change ratio acquirer.

3. The facility utilization measurement apparatus of claim 2, wherein
   the stay determinator determines whether the user stays in the determination area, based on continuity of the image change ratio at a plurality of points of time in a predefined determination period of time.

4. The facility utilization measurement apparatus of claim 1, wherein
   the use information generator obtains an occupancy degree indicating that the user stays in each determination area for a predetermined unit time, as the use information.

5. The facility utilization measurement apparatus of claim 4, wherein
   the use information generator obtains an average occupancy degree of each determination area by averaging the occupancy degree of each unit time in each determination area during a predetermined aggregate period of time.

6. The facility utilization measurement apparatus of claim 4, wherein
   the use information generator obtains an average occupancy degree of each unit time by averaging the occupancy degree of each unit time in each determination area, in a plurality of determination areas which is used as an aggregate target.

7. The facility utilization measurement apparatus of claim 1, further comprising:
   a group setter that sets aggregation groups in order to divide a plurality of determination areas into groups in accordance with an area classification in the facility,
   wherein the use information generator generates the use information of each aggregation group based on the use information of each determination area.

8. A facility utilization measurement method which causes an information processing apparatus to perform processes of measuring utilization of a facility by a user based on an image obtained by capturing the inside of the facility,
   wherein an instruction which is executed by a processor of the information processing apparatus and is stored in a memory includes
   setting, for each seat when each user is assigned to the seat, a determination area of a plurality of determination areas for determining whether a user stays, on the image,
   generating, for each seat, stay information regarding whether the user is seated or unseated, for each determination area based on a change status of the image in the determination area,
   generating use information indicating either of a seated or unseated occupancy status for each seat, based on the stay information for each determination area, based on the stay information, such that erroneously generating use information indicating the seated occupancy status of a user passing by the determination area is avoided, and
   generating display information for displaying the use information and outputting the generated display information.

* * * * *